Aug. 7, 1962 L. LE ROY HACKLER 3,048,039
MERCURY SAVER AND OIL TRAP FOR ORIFICE METERS
Filed June 9, 1958

INVENTOR.
L.L. HACKLER
BY Hudson and Young
ATTORNEYS

United States Patent Office 3,048,039
Patented Aug. 7, 1962

3,048,039
MERCURY SAVER AND OIL TRAP FOR
ORIFICE METERS
Lester Le Roy Hackler, Odessa, Tex., assignor to Phillips
Petroleum Company, a corporation of Delaware
Filed June 9, 1958, Ser. No. 740,715
8 Claims. (Cl. 73—395)

This invention relates to mercury-type orifice meters. In one aspect this invention relates to an improved mercury saver for orifice meters. In another aspect this invention relates to an oil trap for use with orifice meters.

Mercury-type orifice meters are well known and are used extensively in the measurement of gas volumes, particularly in gas gathering systems wherein gas is collected from a large number of individual leases. These meters comprise a manometer which can be a U-tube containing mercury and they are connected to the gas line, containing an orifice, so that one leg of the U-tube is in communication with the gas on the upstream side of the orifice and the other leg is in communication with the gas on the downstream side of the orifice. Because of conditions over which the gathering system has no control, there are occasional surges in gas pressure and/or volume of sufficient magnitude to blow the mercury out of the meter and into the gas line where it is lost for all practical purposes. On other occasions small quantities of oil are carried in the gas stream and it is desirable that the oil be kept out of the meter. If oil gets into the mercury chamber, or if mercury is lost from the chamber, the meter is no longer accurate and erroneous gas volumes are then computed from the meter chart. Various means have been proposed to prevent loss of mercury from the meter and to prevent entrance of oil to the meter; however, for one reason or another, these devices have not been successful in preventing loss of mercury from the meter or in maintaining the accuracy of the meter due to foreign materials, such as oil, getting into the meter.

It is an object of this invention to provide a device to effectively prevent the loss of mercury from an orifice meter.

It is also an object of this invention to provide a device which will prevent the entrance of oil or other contaminating liquids into the mercury chamber of an orifice meter.

It is a further object of this invention to provide an orifice meter which does not require recalibration after having experienced an abnormal surge of pressure or volume of gas being measured.

Other advantages and features of this invention will be apparent to one skilled in the art upon studying the detailed description of the invention and the appended drawing wherein.

Figures 1, 2, 3, 4:
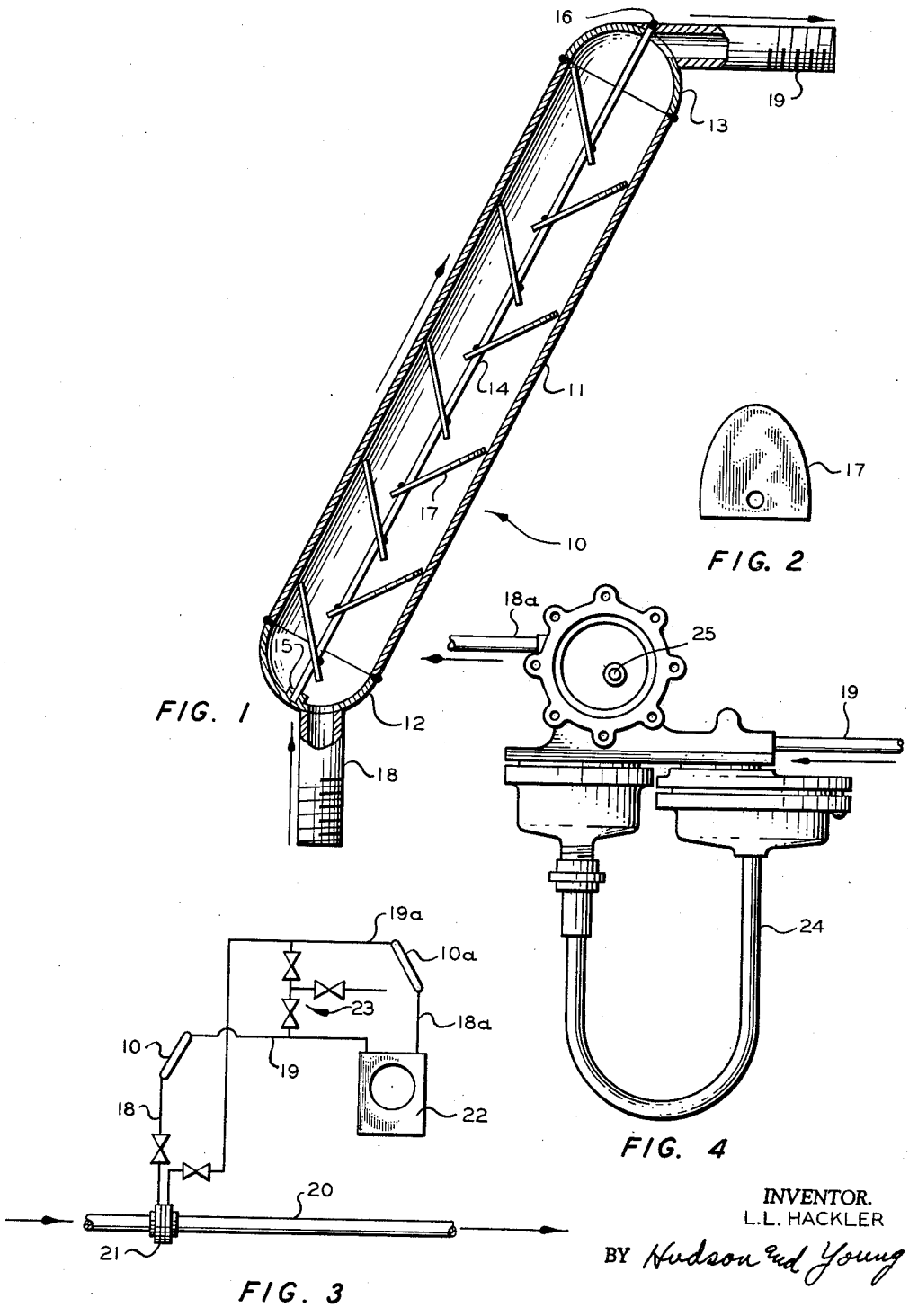
FIGURE 1 shows, in cross section, a view of the trap of the invention.
FIGURE 2 is a detail of a deflection plate used in the trap of FIGURE 1.
FIGURE 3 shows a meter setting with the mercury saver and the oil trap of the invention embodied therein.
FIGURE 4 is an illustration of a mercury manometer which can be used in a mercury type orifice meter.

Broadly, the invention contemplates a unique device which prevents passage, through a conduit, of a minor amount of liquid carried in a gaseous stream. The invention provides a trap which effectively prevents the passage of oil into the mercury trap of an orifice meter and effectively prevents loss of mercury from an orifice meter resulting from surges in the flow of the gas being measured.

Referring now to the drawing, and particularly to FIGURE 1, the trap means indicated at 10 is composed of cylinder 11, basecap 12 and headcap 13. The basecap 12 and the headcap 13 can be secured to the cylindrical member 11 by welding, although it may be desired to secure the headcap 13 to the cylindrical member 11 by a flange or by threaded engagement for removal in case it is desired to adjust or to replace the element positioned therein. If desired, the cylindrical element 11 can be constructed in two parts and joined together by a coupling such as a union.

The element positioned in the trap 10 comprises a center rod 14 seated in socket 15 of basecap 12 and secured to headcap 13, for example, by spot welding indicated at 16. A plurality of deflection plates 17 are secured to rod 14. The deflection plates 17 are positioned so as to contact the wall of the trap at their upper part in sealing relationship and are secured to the rod 14 at the lower edge of the deflection plate so that the deflection plate describes an angle of 15 to 25 degrees from vertical with respect to the center rod 14. As illustrated in FIGURE 1, the deflection plates 17 are arranged in two groups, each group comprising a plurality of spaced apart parallel plates projecting inwardly and downwardly and obstructing more than one half of the cross-sectional area of cylinder 11, each group of plates being in contact with opposite walls of cylinder 11 and being in overhanging relationship with the other group of plates. The deflection plates thus provide a plurality of baffle members which effectively prevent the passage of liquid, even in fine droplet form, through the trap except through the center portion of the trap defined by the lower edges of the deflection plates. The basecap 12 is secured to a vertical pipe 18 so that the trap is positioned at an angle of about 15 degrees from vertical with respect to pipe 18. A pipe 19 is secured to headcap 13 so as to extend substantially horizontally therefrom and pipes 18 and 19 are in communication with the interior of the trap 10.

Referring to FIGURE 2, it can be seen that the configuration of the deflection plate is such that it is in contact with the cylindrical wall of vessel 11 at all points except at the base of the deflection plate.

Referring now to FIGURE 3, a pipe line 20, carrying gas, has orifice flange 21 positioned therein with connections for pipe 18 upstream from the orifice and pipe 19a downstream from the orifice. Trap 10, being on the inlet or high pressure side, acts as an oil trap and trap 10a, being on the outlet or low pressure side, acts as a mercury trap to prevent loss of mercury from the meter 22. The equalizing valves indicated at 23 are used to zero the meter.

FIGURE 4 illustrates one type of mercury manometer which can be used in an orifice meter. High pressure conduit 19 is connected to one leg of the manometer 24 and low pressure conduit 18a is connected to the other leg of the manometer. A pen (not shown) can be connected to shaft 25. Shaft 25 is actuated by a float (not shown) which rides on the mercury in one leg of the manometer. A suitable mercury manometer is shown in U.S. Patent 2,020,432, issued in 1935 to W. H. Parker. Other types of manometers are shown in "Chemical Engineers Handbook," second edition, published by McGraw-Hill Co., 1941, pages 2040 to 2044.

Normally, there will be no flow through the meter 22 of FIGURE 3 and each leg of the mercury manometer will be subjected to the pressure of the gas on its respective side of the orifice. When an abnormal surge in the flow of gas is of sufficient pressure and volume to lift the mercury out of the manometer, it will be retained in the baffled mercury trap 10a and any liquid, such as oil, water, or condensate gasoline, existing in the gas flow will be retained in the baffle oil trap 10 for the duration of the surge. Upon resumption of normal flow, the liquids in the traps 10 and 10a will drain back to their original sources and the meter will again indicate the flow of gas. The internal volume of the mercury trap should be sufficient to maintain all of the mercury in the manometer suspended during the duration of a surge pressure. The internal volume of the oil trap should be sufficient to maintain in suspension the maximum amount of liquid expected during a surge period.

It has been determined by test that the trap 10, or 10a, should be positioned at about 15 degrees from vertical. The trap can be operated at an angle of between 15 and 30 degrees from the vertical when severe surge conditions are not expected. The deflection plates are preferably positioned at an angle of about 30 degrees with respect to a plane through the longitudinal axis of the center rod; however, this angle can be varied 5 to 10 degrees in either direction so long as the deflection plates on the lower side are tilted from the horizontal sufficiently so that the mercury or other liquid will rapidly drain from the deflection plate. The deflection plates are positioned in the trap so that the lower edges thereof are substantially horizontal and each deflection plate overhangs the one below.

Traps having the following dimensions have been fabricated and tested in laboratory tests and also in field service. The over-all length of the trap was 12 inches and the internal diameter was 1⅜ inches. Nine deflection plates were secured to a ⅛-inch diameter center rod and the deflection plates were positioned with an angle of 30 degrees with respect to the center rod. After being secured to the center rod the deflection plates were lathe turned and polished for a snug fit to the internal surface of the trap member. The trap was positioned on the supporting pipe with an angle of about 15 degrees from vertical.

The trap was tested as a mercury trap on a meter operating at 250 p.s.i. static pressure with a 300 p.s.i. surge of 1½ minutes' duration for 20 surges, and at 15 p.s.i. static pressure with a 145 p.s.i. surge of 1½ minutes' duration for 20 surges, with the trap at about 15° from vertical, and the meter was found to be accurate after the tests. The meter was found to operate accurately within about one minute after the mercury had been blown from the manometer and allowed to return to the manometer. Mercury droplets came through the trap in both vertical and horizontal positions at the high flow rates but no mercury came through the trap when it was positioned at about 15 to 30° from vertical. Mercury returned to the manometer more rapidly with the trap at 15° from vertical than with the trap at 30° from vertical.

An installation as shown in FIGURE 3 has been employed in normal field service for several months without loss of mercury and without contamination of the mercury by oil. The meter has not required recalibration normally required as a result of mercury being blown from the manometer.

Reasonable variations and modifications are possible within the scope of the present disclosure without departing from the spirit and scope of the invention.

That which is claimed is:

1. For use in an orifice meter comprising a manometer tube containing a liquid, a low pressure conduit connected to one end of the tube and a high pressure conduit connected to the other end of the tube, apparatus comprising a substantially cylindrical case, with closed top and bottom ends and conduit means of smaller diameter than that of said case in each of said ends, positioned at an angle of about 15 to 30 degrees from vertical; the conduit means in the bottom end being in communication with said low pressure conduit; the conduit means in the top end being for communication with a source of low pressure; and a plurality of deflection plates arranged in two groups in said case, each group comprising a plurality of spaced apart parallel plates projecting inwardly and downwardly and obstructing more than one half of the cross-sectional area of said case, each group of plates being in contact with opposite walls of said case and being in overhanging relationship with the other group of plates.

2. The apparatus of claim 1 wherein the angle of the case is about 15 degrees from vertical.

3. The apparatus of claim 1 wherein the deflection plates project inwardly and downwardly at an angle of about 20 to about 40 degrees with respect to the wall of the case.

4. The apparatus of claim 1 wherein the angle of the case is about 15 degrees from vertical and the angle of the deflection plates is about 30 degrees with respect to the wall of the case.

5. A differential pressure gauge comprising a manometer tube containing a liquid; a first conduit connected to one end of said tube for supplying high pressure fluid to said tube; a second conduit connected to the other end of said tube for supplying low pressure fluid to said tube; means for indicating the displacement of the liquid in said tube; a first trap; as hereinafter described, having its bottom end in communication with a supply of high pressure fluid and its top end in communication with said first conduit; and a second trap, as hereinafter described, having its bottom end in communication with said second conduit and its top end in communication with a source of low pressure fluid, said first and second traps each comprising a substantially cylindrical case, having closed top and bottom ends, positioned at an angle of about 15 to 30 degrees from vertical, conduit means of smaller diameter than that of said cases in the bottom end, conduit means of smaller diameter than that of said cases in the top end, and a plurality of deflection plates arranged in two groups in each case, each group comprising a plurality of spaced apart parallel plates projecting downwardly and inwardly and obstructing more than one half of the cross-sectional area of said case, each group of plates being in contact with opposite walls of said case and being in overhanging relationship with the other group of plates.

6. The apparatus of claim 5 wherein the angle of each trap is about 15 degrees from vertical and the angle of the deflection plates in each trap is about 30 degrees with respect to the wall of the case of said trap.

7. Apparatus for preventing a minor amount of liquid contained in a gaseous stream from passing from a first section of a conduit to a second section of said conduit which comprises a substantially cylindrical vessel of larger diameter than said conduit having an inlet in one end and an outlet in the other end positioned at an angle of about 15 to about 30° from vertical; means for connecting the first section of conduit with the inlet of said vessel; means for connecting the second section of conduit with the outlet of said vessel; and a plurality of deflection plates arranged in two groups in said vessel, each group comprising a plurality of spaced apart parallel plates projecting inwardly and downwardly and obstructing more than one half of the cross-sectional area of said vessel, each group of plates being in contact with opposite walls of said vessel and being in overhanging relationship with the other group of plates.

8. Apparatus for determining the pressure drop across an orifice located in a pipeline which comprises, in combination, a pipeline, an orifice located in said pipeline, a mercury manometer, a first conduit means communicating with said pipeline upstream from said orifice and with the high pressure side of said mercury manometer, a mercury saving device positioned at an angle with respect to vertical in the range of about 15 to about 30 degrees, a second conduit means communicating between the low pressure side of said mercury manometer and said mercury saving device, a third conduit means communicating between said mercury saving device and said pipeline downstream from said orifice, said mercury saving device comprising a vessel of larger cross section than said second conduit means, an inlet at one end of said mercury saving device, said inlet in communication with said second conduit means, an outlet at the other end of said mercury saving device, said outlet in communication with said third conduit means, and a plurality of deflection plates arranged in two groups in said mercury saving device, each group comprising a plurality of spaced apart parallel plates projecting inwardly and downwardly and obstructing more than one half of the cross sectional area of said mercury saving device, each group of plates being in contact with opposite walls of said mercury saving device and being in overhanging relationship with the other group of plates.

References Cited in the file of this patent

UNITED STATES PATENTS

| | | |
|---|---|---|
| 164,652 | Mason | June 22, 1875 |
| 520,675 | Gindele | May 29, 1894 |
| 1,586,201 | Kauffmann | May 25, 1926 |
| 2,721,621 | Hall | Oct. 25, 1955 |

FOREIGN PATENTS

| | | |
|---|---|---|
| 27,280 | Great Britain | Dec. 12, 1903 |